US 9,735,577 B2

(12) United States Patent
Cerutti et al.

(10) Patent No.: US 9,735,577 B2
(45) Date of Patent: *Aug. 15, 2017

(54) MAINTAIN POWER SIGNATURE (MPS) POWERED DEVICE (PD)

(71) Applicant: Maxim Integrated Products, Inc., San Jose, CA (US)

(72) Inventors: Cristian Cerutti, Voghera (IT); Phillip J. Benzel, Pleasanton, CA (US); John M. Wettroth, Cary, NC (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,436

(22) Filed: Oct. 5, 2015

(65) Prior Publication Data

US 2016/0028233 A1    Jan. 28, 2016

Related U.S. Application Data

(63) Continuation of application No. 13/719,685, filed on Dec. 19, 2012, now Pat. No. 9,152,161.

(60) Provisional application No. 61/577,814, filed on Dec. 20, 2011.

(51) Int. Cl.
*H02J 3/02* (2006.01)
*G05F 3/02* (2006.01)
*G05F 1/70* (2006.01)

(52) U.S. Cl.
CPC .................. *H02J 3/02* (2013.01); *G05F 1/70* (2013.01); *G05F 3/02* (2013.01)

(58) Field of Classification Search
CPC .... G05F 1/00; G05F 1/70; H04L 25/02; H02J 3/02

USPC .............. 323/223, 225, 303, 312, 901, 909; 361/18, 87, 93.1
See application file for complete search history.

(56) References Cited

U.S. PATENT DOCUMENTS

| | | | |
|---|---|---|---|
| 7,449,796 B2 | 11/2008 | Elkayam et al. | |
| 7,532,017 B2 * | 5/2009 | Anderson | G01R 27/16 324/691 |
| 7,571,331 B2 * | 8/2009 | Ohana | G06F 1/26 713/300 |
| 7,643,320 B2 | 1/2010 | de la Torre Vega et al. | |
| 7,782,094 B2 * | 8/2010 | Vorenkamp | G06F 1/266 323/303 |

(Continued)

OTHER PUBLICATIONS

Office Action dated Mar. 20, 2017 for Chinese Application No. 201210599052.6.

*Primary Examiner* — Yemane Mehari
(74) *Attorney, Agent, or Firm* — Advent, LLP (57) ABSTRACT

A Maintain Power Signature (MPS) Powered Device (PD) is described. In one or more implementations, the MPS device comprises a current sensor configured to sense current flowing from Power Sourcing Equipment (PSE) to the PD. The current sense based MPS device also comprises a current generator configured to sink electrical current to prevent the PSE from removing power to the PD. Thus, the electrical current comprises a current amplitude characteristic selected based upon MPS requirements of the PSE. In some implementations, the current is sunk to a ground. In other implementations, the current is sunk to a storage device, such as a storage device included with the PD and/or external to the PD.

18 Claims, 6 Drawing Sheets

(56) References Cited

U.S. PATENT DOCUMENTS

| | | |
|---|---|---|
| 8,541,908 B2 | 9/2013 | Tsai |
| 8,868,946 B2 * | 10/2014 | Buhari ................... G06F 1/266 |
| | | 713/320 |
| 8,898,446 B2 | 11/2014 | Ronen et al. |
| 9,152,161 B2 * | 10/2015 | Cerutti ..................... G05F 3/02 |
| 2005/0085212 A1 | 4/2005 | Peker et al. |
| 2011/0119506 A1 | 5/2011 | Tsai |
| 2013/0154603 A1 * | 6/2013 | Cerutti ..................... G05F 3/02 |
| | | 323/312 |

* cited by examiner

MAINTAIN POWER SIGNATURE (MPS) POWERED DEVICE (PD)

CROSS-REFERENCE TO RELATED APPLICATIONS

The present application claims the benefit under 35 U.S.C. §119(e) of U.S. Provisional Application Ser. No. 61/577,814, filed Dec. 20, 2011, and titled "CURRENT SENSE BASED MPS". U.S. Provisional Application Ser. No. 61/577,814 is herein incorporated by reference in its entirety.

BACKGROUND

Power over Ethernet (PoE) technology describes passing electrical power, along with data, on Ethernet cabling. It is regulated by the IEEE 802.3at-2009 standard. Power is supplied in common mode over two or more of the differential pairs of wires found in the Ethernet cables and comes from a power supply within a PoE-enabled networking device such as an Ethernet switch, or can be injected into a cable run with a midspan power supply. The basic elements of a PoE system are: 1) Power Sourcing Equipment (PSE): a device such as a switch that provides ("sources") power on the Ethernet cable, and 2) a Powered Device (PD) powered by a PSE that consumes energy from the PSE. Examples of powered devices include wireless access points, Internet Protocol (IP) telephones, and IP cameras.

SUMMARY

A Maintain Power Signature (MPS) Powered Device (PD) is described. In one or more implementations, the MPS device comprises a current sensor configured to sense current flowing from Power Sourcing Equipment (PSE) to the PD. The current sense based MPS device also comprises a current generator configured to sink electrical current to prevent the PSE from removing power to the PD. Thus, the electrical current comprises a current amplitude characteristic selected based upon MPS requirements of the PSE. In some implementations, the current is sunk to a ground. In other implementations, the current is sunk to a storage device, such as a storage device included with the PD and/or external to the PD.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

A procedure defined by the PoE standard enables the PSE to detect a valid load; once it is detected it starts providing power to it. With reference to the PoE standard, a PSE may not leave power on after the powered device has been unplugged, because a powered cable could be plugged into a device that doesn't expect power. The 802.3at standard defines two methods for a PSE to sense when a PD is unplugged, Alternating Current (AC) disconnect and Direct Current (DC) disconnect, allowing implementers to select the method best suited to their system. DC disconnect determines the presence of a PD based on the amount of DC current flowing from the PSE to the PD. When the current stays below approximately five milliamperes (5 mA) for approximately four hundred milliseconds (400 ms), the PSE assumes that the PD is absent and turns off the power. A PSE that implements AC disconnect measures the AC impedance of the Ethernet port. When disconnected, the port should be high impedance (e.g., providing several megaohms (MOhms) of impedance).

A PD is generally designed to include a highly efficient DC-to-DC power converter that powers a microprocessor/micro-controller based circuit. For example, a DC-to-DC power converter may be configured to convert a voltage of fifty volts (50 V) to a voltage in the range of approximately three volts (3V) to five volts (5V). The PD may occasionally consume a small amount of power thanks to the efficiency of the DC-to-DC converter and a low-power mode that many micro-controllers feature. In case the current falls below the threshold indicated by the standard, a PSE that employs a DC disconnect will remove power to the PD. Then, the PSE may initiate a new procedure to detect a load. Once a load has been detected, the PSE will provide power to the PD again, resulting in an undesirable "hiccup" operation of the PD. For example, a PD supplied by a PSE that sinks a current below ten milliamperes (10 mA) can be recognized as an open load by the PSE and disconnected from the power source. Thus, according to the PoE standard, a minimum current should be drawn to provide a Maintain Power Signature (MPS). However, many applications may require less power than the minimum provided by the PoE standard.

Since a PD is disconnected when it does not sink a minimum current, one technique is to add a fixed current source that, together with the minimum power consumption of the device's circuit, results in current above the minimum limit as expressed by the standard. However, this approach reduces the system efficiency at idle, because it forces a minimum steady state power to be drawn from the PSE. In a PoE system, the current budget that can be delivered to a certain PD depends on its class and has an upper limit that, if tripped, may be considered a fault such that the PD gets disconnected. At that point, when a fixed current is drawn, it reduces the actual budget for total usable power by the fixed current itself. This also results in steady power consumption.

Accordingly, an MPS device is described. The MPS device is configured to sense current flowing from a PSE to a PD and sink current pulses from the PSE, preventing the PSE from removing power to the PD. The current sense threshold and pulse characteristics (timing and current amplitude) can be chosen according to, for example, the PoE standard, to minimize extra power consumption. The techniques of the present disclosure may be applied to any PD for the purpose of preventing a PSE from disconnecting power when the PD is operating while requiring only a small current. For example, a PD in accordance with the present disclosure may be used with applications including, but not necessarily limited to: wireless access points, IP telephones, and/or IP cameras. Further, MPS circuitry may be used with a powered antenna, e.g., for recognizing the antenna as part of an electrical network without initiating radio power to the antenna. In some instances, the current is sunk to a ground. In other instances, the current is sunk to a storage device, such as a storage device included with the PD. For example, a passive switch can be used to charge a capacitor to an input of a PD. In implementations, the passive switch can use a controlled current to avoid load variations. A buck type switcher can also be used to transfer energy to a storage capacitor. In some instances, a continuous mode is used for the buck type switcher. Further, one or more switch capacitors can be used to store energy from the current sunk by the PD.

The current sense based MPS comprises a current sense circuit that is configured to detect when PD current consumption drops below a certain threshold, represented herein by Iref. In implementations, Iref can be chosen so that, considering its spread, Iref is above the DC disconnect current imposed by a PoE standard, represented by Iport_MPS. An example MPS standard (e.g., the 802.3at standard) requires a current draw equal to or above a minimum input current Iport_MPS of ten milliamperes (10 mA) for a minimum duration of seventy-five milliseconds (75 ms) followed by an optional MPS dropout for no longer than two hundred fifty milliseconds (250 ms). The current sense based MPS can be used with a PD in a PoE system to maintain a power signature even at light load condition, while maintaining efficiency and without reducing the current budget. In implementations, the current sensor and comparator senses the current flowing into the PD and compares this to a fixed threshold (for instance twelve milliamperes (12 mA), where the minimum set by the PoE standard is ten milliamperes (10 mA)).

Example Implementations

Figure 1:
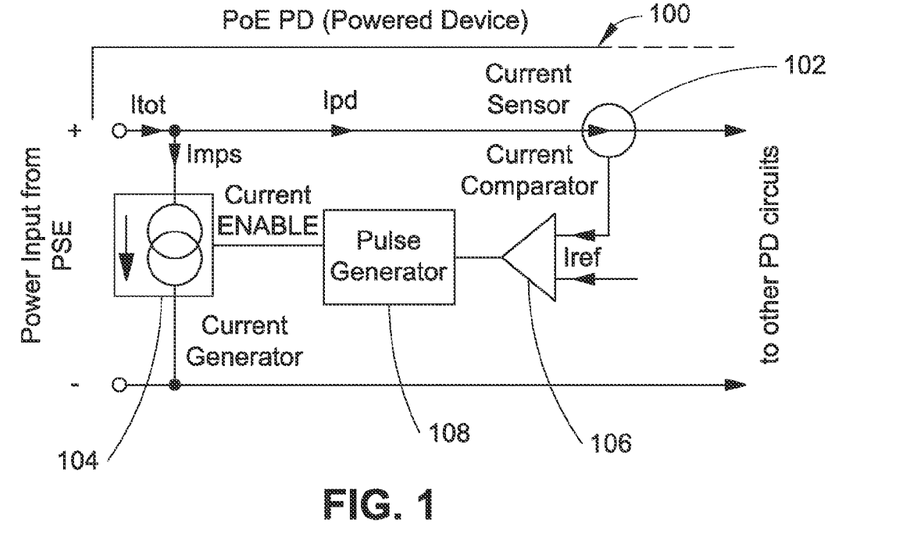
FIG. 1 is a circuit diagram illustrating current sense based MPS circuitry in accordance with example implementations of the present disclosure.
Figure 2:
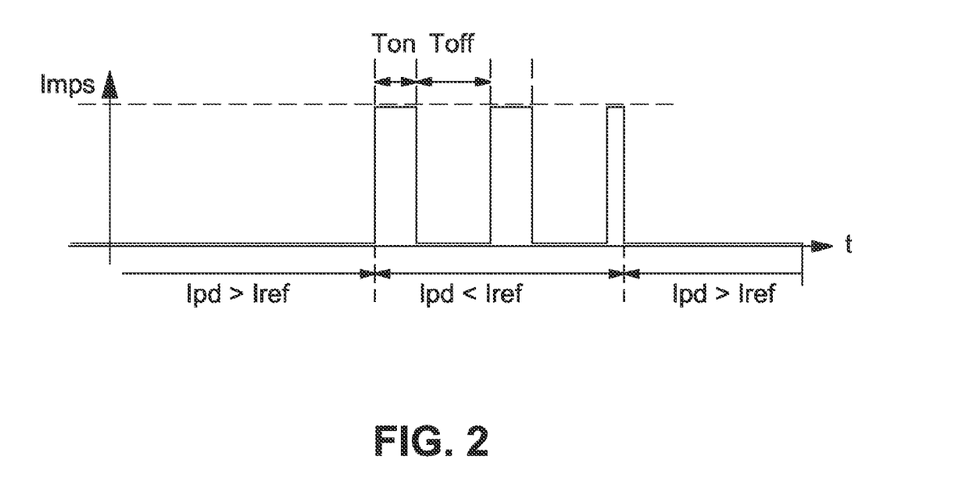
FIG. 2 is a graph illustrating an example current waveform produced using a current sense based MPS device in accordance with example implementations of the present disclosure, where a particular implementation of a PoE standard requires that a current generator be active a minimum of seventy five milliseconds (75 ms), indicated in the accompanying figure as Ton, at a maximum of every two hundred fifty milliseconds (250 ms), indicated in the accompanying figure as Toff.

Referring now to FIGS. 1 and 2, a current sense based MPS powered device (PD) 100 is described. The PD 100 includes a current sensor 102 configured to sense current flowing from PSE to the PD 100 and a current generator 104 configured to sink electrical current to prevent the PSE from removing power to the PD 100. In implementations, when a current comparator 106 of the PD 100 senses that current Ipd is below a desired threshold (e.g., Iport_MPS), a pulse generator 108 is activated. The pulse generator 108 can be configured to drive a current source on and off according to timing that is selected to comply to a standard, such as the IEEE 802.3at-2009 standard previously described, considering the possible spread of the time base (e.g., as described by the 802.3at standard). For example, a pulse generator 108 can be configured so that its "ON" time, Ton, is at least approximately eighty milliseconds (80 ms) and its "OFF" time, Toff, is at least approximately two hundred forty milliseconds (240 ms). The current source driven by the pulse generator 108, when enabled, can be configured to produce a current that is summed to at least the minimum possible current, represented by Ipd, such that the total current drawn by the device during the "ON" time of the pulse generator 108 is greater than the minimum specified by Iport_MPS. For instance, Itot, which represents the total current drawn by the device can be determined as follows:

$$Itot=Imps+Ipd$$

In implementations, Itot is selected to be greater than Iport_MPS, considering the Imps accuracy limits. As shown in FIG. 1, the current sensor 102 reading is configured so as not to be affected by the Imps current. An example Imps current waveform produced by a PD using the current sense based MPS circuitry described above is provided in FIG. 2.

However, the configuration described in FIGS. 1 and 2 is provided by way of example with reference to a specific configuration and is not meant to be restrictive of the present disclosure. In other implementations, a steady current source directly activated by the current sense can be employed with the current sense based MPS. It should be noted that this type of implementation may not require a pulse generator. However, a pulsed current source may allow the average current drawn from the PSE to maintain a power signature that is considerably lower than its steady counterpart. For instance, in the specific example described above, the average current may be only about one quarter (¼) of the peak Imps.

Another implementation of the current generator block uses a continuous controlled current source. Imps may be described as follow:

$$Imps=Iport\_MPS-Ipd+Imargin$$

In this configuration, Imargin takes into account the spread of Ipd readings as well as the Imps accuracy. This implementation may use a precision analog reading of the Ipd current and an analog block that realizes the above equation. Further, a timer can be added to control "ON" and "OFF" states of the continuous controlled current source.

In some implementations, when the current is less than twelve milliamperes (12 mA) a timing generator circuit is activated and, after a blanking time, it drives a current source (for instance 12 mA) with timing. This notifies the PSE that a load is still there, and the PSE maintains power to the PD. Further, the average current can be minimal, since the duty cycle is not one hundred percent (100%), because it takes into account the standard specification in terms of minimum pulse duration (Ton) and maximum dropout (blanking time and Toff).

Figure 3:
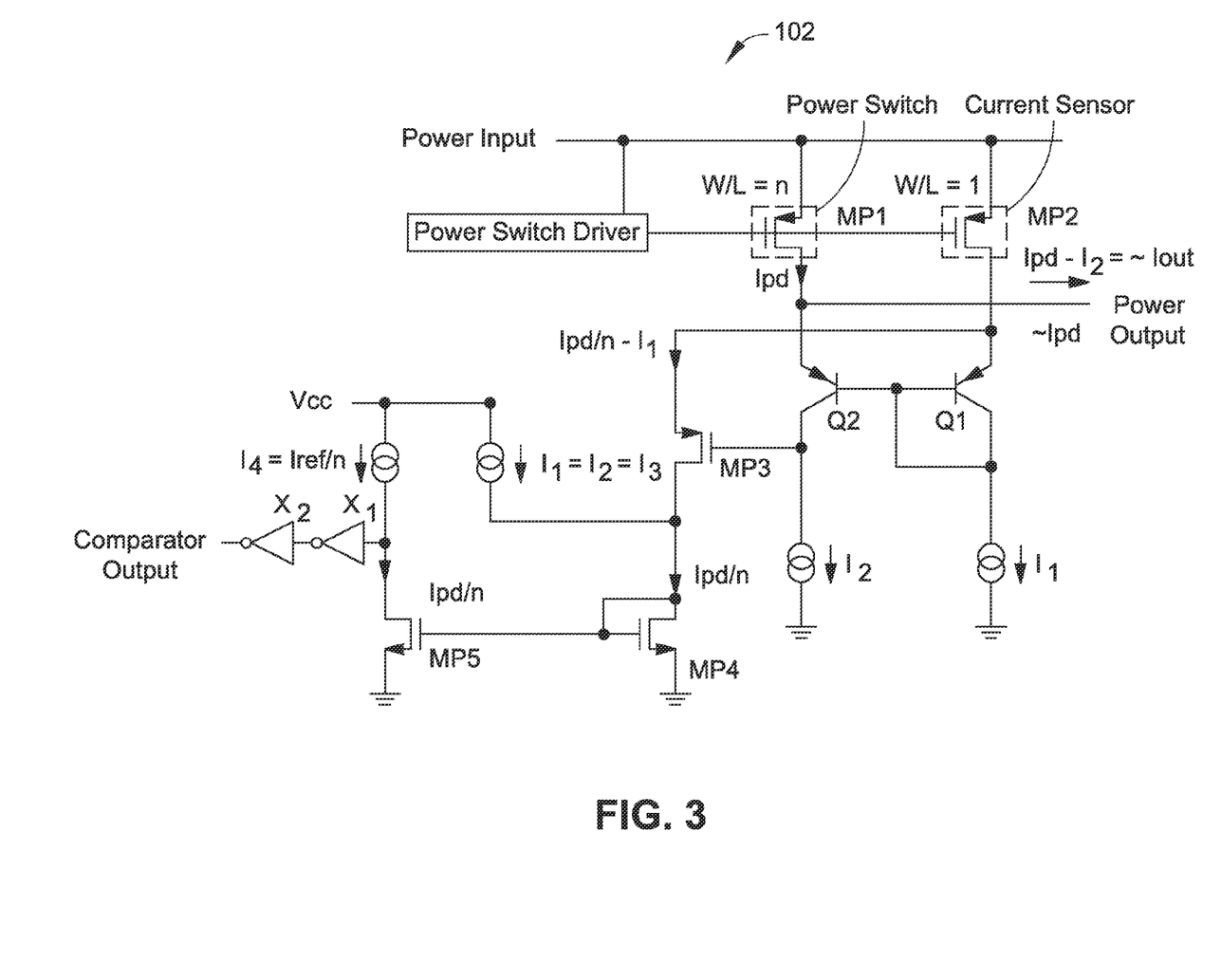
FIG. 3 is a circuit diagram illustrating current sensor circuitry for a current sense based MPS device, such as a device including the current sense based MPS circuitry illustrated in FIG. 1, in accordance with example implementations of the present disclosure.

Referring now to FIGS. 1 and 3, in PD applications, a switch can be used to isolate a capacitor from the Ethernet. This can be implemented using, for instance, a Metal-Oxide-Semiconductor Field-Effect Transistor (MOSFET) that acts as a switch. An integrated circuit implementation of a current sensor 102 is shown in FIG. 3, where MP1 is the power switch, and MP2 is a scaled version of MP1, n times smaller (e.g., where n equals one thousand (1000)). The circuit formed by Q1, Q2, and MP3 forces the drain of MP2 to be at the same voltage as MP1. Since all the terminals of MP2 are at the same voltage level of MP1, then its drain current is Ipd/n. The systematic offset due to the I2 (bias current) that flows into MP2 is compensated for by I3 that is summed to Ipd/n before entering MP4. The current mirror MP4 and MP5 is used to compare Ipd/n with the current Iref/n (e.g., approximately twenty microamperes (20 µA), for instance, setting the threshold to approximately twenty milliamperes (20 mA)). In implementations of the disclosure, the current mirror formed by MP4 and MP5 has a ratio of at least approximately one-to-one (1:1). The output of the MOS inverter X1 goes high when Ipd is lower than Iref. It should be noted that a capacitor can be added to MP3 gate to GND for AC compensation of the loop.

Figure 4:
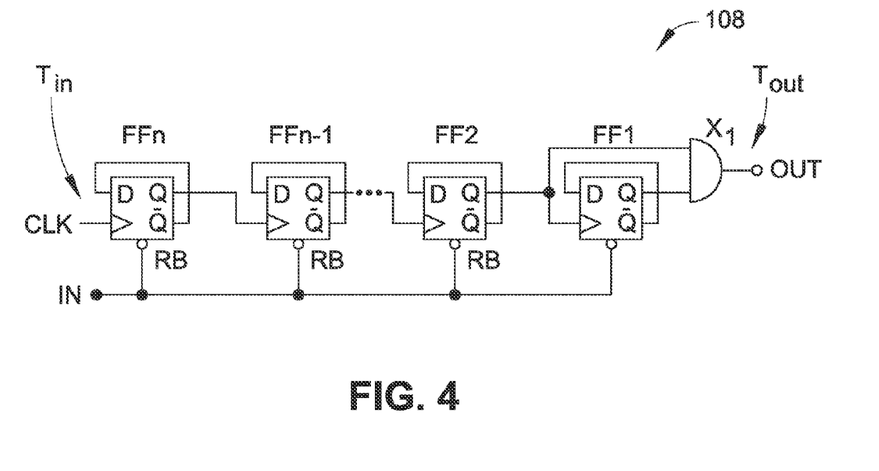
FIG. 4 is a circuit diagram illustrating pulse generator circuitry for a current sense based MPS device, such as a device including the current sense based MPS circuitry illustrated in FIG. 1, in accordance with example implementations of the present disclosure.

Referring now to FIGS. 1 and 4, a pulse generator 108 can be used to activate the current source with a timing that is consistent with the pulse minimum duration and MPS drop-out specification expressed in a PoE standard (e.g., the IEEE 802.3at-2009 standard previously described). A possible implementation is a pulse generator 108 based on a clock signal. In the example illustrated in FIG. 4, the input clock has a period of Tin. In some cases a Ton=Toff/3 (i.e., a 25% duty cycle) implementation may be used (e.g., with the circuit described in FIG. 4). In the example illustrated in FIG. 4, the duty cycle is at least approximately equal to Ton/Tout, which is equal to $Tin*2^{(n-2)}/Tin*2^n$, which is equal to $2^{(-2)}$, which is equal to one-quarter (¼). This configuration can be implemented with an asynchronous downward binary counter formed by n D-type Flip-Flops, and decoder logic. Once IN goes high, at the first clock increment, all the Q's of the Flip-Flop go high, so does OUT starting the "ON" period. Then, after $Tin*2^{(n-2)}$, OUT goes low again. The Tout period is $Tin*2^n$. Thus, the duty-cycle is 25%. The input clock frequency can be chosen to get a particular Tout period. Depending upon the process spread of the time base, according to the pulse minimum duration and MPS dropout expressed in the standard, a different duty cycle may be used. In implementations, a state machine can be used to select appropriate Ton and Toff starting from a clock source.

Figure 5:
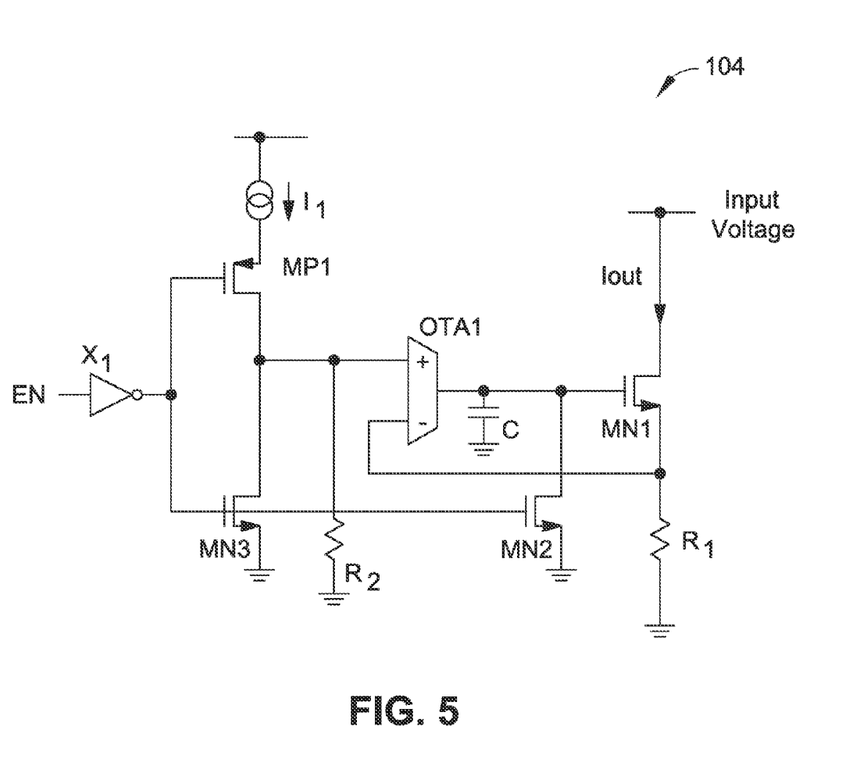
FIG. 5 is a circuit diagram illustrating current generator circuitry for a current sense based MPS device, such as a device including the current sense based MPS circuitry illustrated in FIG. 1, in accordance with example implementations of the present disclosure.

Referring now to FIGS. 1 and 5, an integrated circuit (IC) comprising a current generator 104 can be implemented for the current sense based MPS with a current mirror. In some implementations, a I-V and V-I conversion may be used to obtain accuracy in the ratio of the mirror, especially when the ratio is high. In these implementations, matching resistors may be used. The implementation shown in FIG. 5 uses a current Iref injected into R2 (whose value is n times larger than R1), and appears at R1 via the OTA1 (Operational Transconductance Amplifier) and MN1 that are connected as a V-I converter. In the example illustrated in FIG. 5, Iref represents an accurately trimmed current and may have a minimal dependence on temperature. MN2, MN3, and MP1 can be used to turn the current on and off. Given an implementation where n=100, Iref can be as low as one hundred microamperes (100 µA) to get ten milliamperes (10 mA) at output.

While the present disclosure has mentioned configuring the current sense based MPS using a priori knowledge of an applicable maintain power standard for a PD, it should be noted that a PD including current sense based MPS circuitry may be configured to learn the MPS configuration for a particular implementation of PSE, setting a threshold that is equal to or higher than the standard. For example, current sense based MPS circuitry can be configured to incrementally adjust the magnitude of current generated by the current generator 104, the duration of the current generated by the current generator 104, and/or the frequency at which the current generator 104 is cycled on and off until "hiccups" in the operation of the PD are reduced and/or eliminated. For example, the Ton time for the current generator 104 can be adjusted up from about seventy five milliseconds (75 ms) in increments of five milliseconds (5 ms) until a PD remains consistently powered by PSE. Further, the Ton time for the current generator 104 can be adjusted downward until a lowest threshold is found at which the PD remains consistently on.

Figure 6:
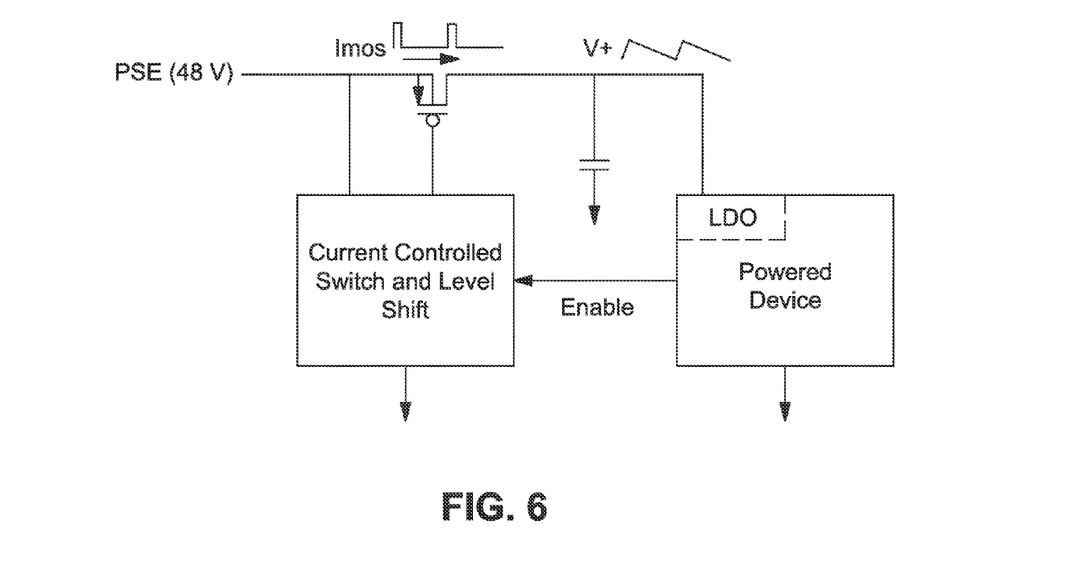
FIG. 6 is a diagrammatic illustration of pulse-width modulation (PWM) current used to drive a PD in accordance with example implementations of the present disclosure.

Referring now to FIG. 6, pulse-width modulation (PWM) current can be used to drive a PD. In the example illustrated in FIG. 6, a PD can be operated using an internally generated Vdd, which is less than at least approximately forty-eight volts (48V). Current through a metal-oxide semiconductor can be pulse width modulated so that Imos is greater than at least approximately ten milliamperes (10 mA) for at least approximately seventy five milliseconds (75 ms), with no more than at least approximately two hundred fifty milliseconds (250 ms) between successive pulses. In implementations, a ripple on V+ can be filtered using a regulator. In embodiments of the disclosure, the energy sunk to the PD is stored during the load period on the PSE. In some embodiments the energy is stored in the PD, while in other embodiments the energy is stored in an energy storage device external to the PD. By storing energy sunk to the PD, the PD can operate at greater efficiency. Further, in an instance where a PD would otherwise draw a continuous (or substantially continuous) amount of current less than an amount prescribed by a standard such as the 802.3at standard, sinking current to the PD at a higher current level for non-continuous time intervals can prevent the PSE from removing power to the PD, while storing the energy can allow the PD to operate at an efficiency at or approaching the efficiency it would have when drawing current continuously at the lower current level.

Figure 7:
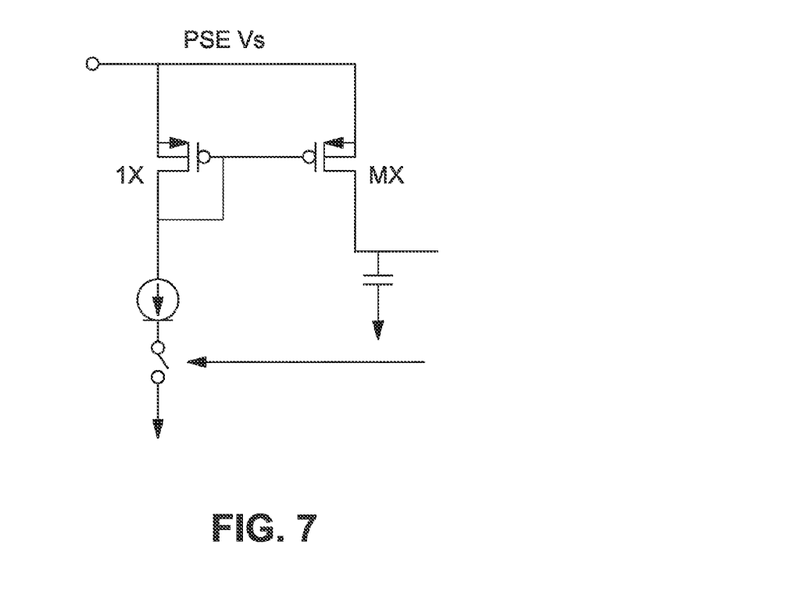
FIG. 7 is a diagrammatic illustration of a current controlled switch for a PD in accordance with example implementations of the present disclosure.

Referring now to FIG. 7, a current controlled switch can be implemented to sink current to drive a PD, where I is greater than at least approximately ten milliamperes (10 mA) and I/C*dt is greater than at least approximately Vs of the PSE minus V+ (e.g., where dt is equal to at least approximately sixty milliseconds (60 ms).

Figure 8:
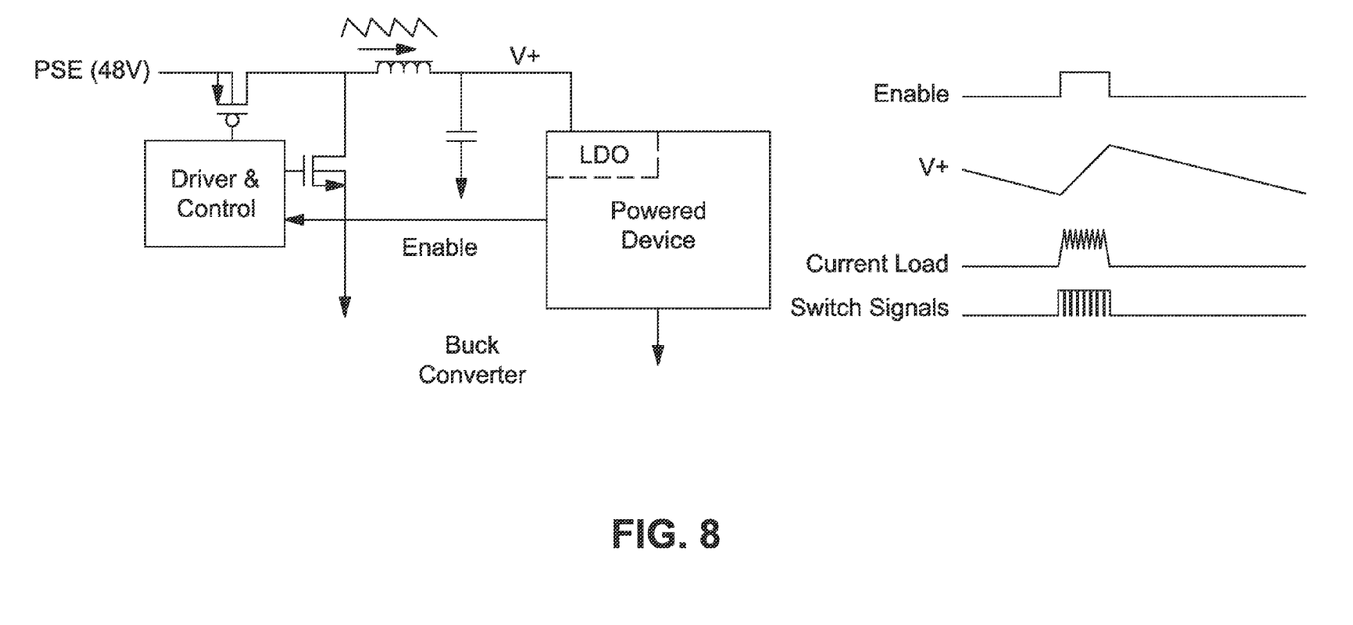
FIG. 8 is a diagrammatic illustration of a buck converter for a PD in accordance with example implementations of the present disclosure.

Referring now to FIG. 8, a buck converter load for a PD can run in a continuous mode and/or a discontinuous mode. The buck converter can be used to sink current to drive the PD. For example, the switching regulator of the buck converter operates during the Ton period, where it presents a continuous load in excess of, for example, ten milliamperes (10 mA) to prevent the PSE from removing power to the PD. In embodiments of the disclosure, this energy is stored in an energy storage device such as a capacitor and/or a battery for use by the PD during the Toff period.

Figure 9:
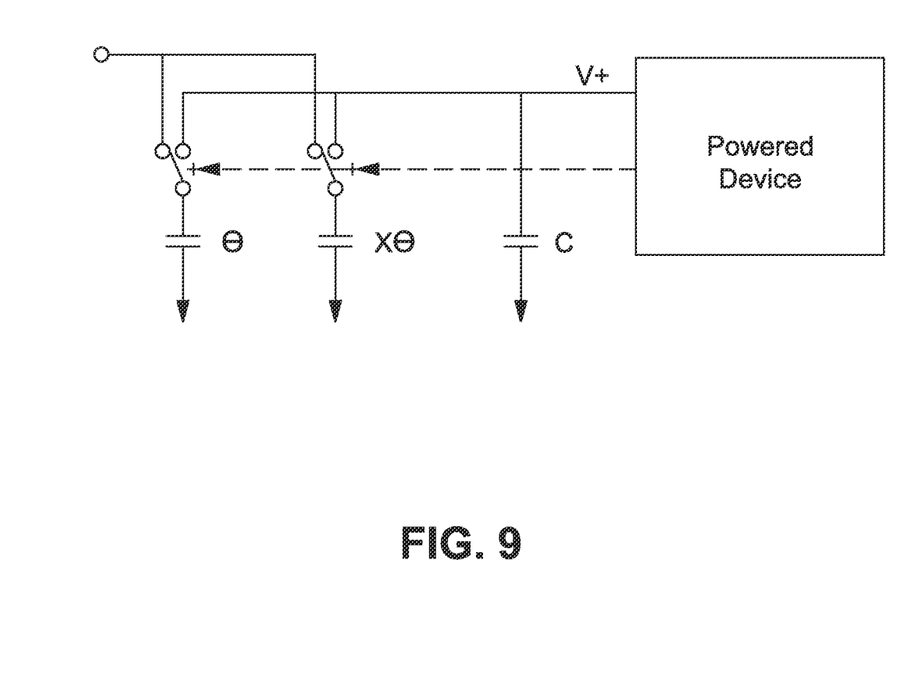
FIG. 9 is a diagrammatic illustration of a charge pump for a PD in accordance with example implementations of the present disclosure.

Referring now to FIG. 9, a charge pump for a PD can be used as a current load for a PD (e.g., depending on V+ voltage). It should be noted that while a dual phase charge pump configuration is illustrated in the accompanying figure, this configuration is provided by way of example only and is not meant to be restrictive of the present disclosure. Thus, in other configurations, a dual phase charge pump with overlap and/or a triple phase charge pump with overlap can be used with a PD.

Conclusion

As used herein, the term "approximately" shall mean approximately and/or exactly with respect to the value or range of values specified. Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A current sense based Maintain Power Signature (MPS) Powered Device (PD) comprising:
    a current sensor configured to sense current flowing from Power Sourcing Equipment (PSE) to the PD; and
    a current generator configured to sink electrical current for preventing the PSE from removing power to the PD, the electrical current comprising a current amplitude characteristic selected based upon MPS requirements of the PSE, wherein the electrical current generated by the current generator has a magnitude selected to account for a margin of error of current sensed by the current sensor.

2. The current sense based MPS device as recited in claim 1, wherein the current amplitude characteristic of the electrical current is selected based upon the IEEE 802.3at-2009 standard.

3. The current sense based MPS device as recited in claim 1, wherein the electrical current generated by the current generator has a magnitude selected so that the total current drawn by the PD is at least approximately ten milliamperes (10 mA) when the current generator is active.

4. The current sense based MPS device as recited in claim 1, wherein the current generator is configured to sink pulses of electrical current comprising timing characteristics selected based upon MPS requirements of the PSE.

5. The current sense based MPS device as recited in claim 4, wherein the current generator is configured to sink the pulses of electrical current for at least approximately seventy five milliseconds (75 ms), with no more than at least approximately two hundred fifty milliseconds (250 ms) between successive pulses.

6. The current sense based MPS device as recited in claim 1, wherein the current generator is configured to be turned off when the total current drawn by the PD is greater than a threshold MPS requirement of the PSE.

7. A method for maintaining power supplied to a Maintain Power Signature (MPS) Powered Device (PD), the method comprising:
    sensing current flowing from Power Sourcing Equipment (PSE) to the PD; and
    sinking electrical current to prevent the PSE from removing power to the PD, the electrical current comprising a current amplitude characteristic selected based upon MPS requirements of the PSE, wherein the current generator is configured to sink pulses of electrical current comprising timing characteristics selected based upon MPS requirements of the PSE.

8. The method as recited in claim 7, wherein the current amplitude characteristic of the electrical current is selected based upon the IEEE 802.3at-2009 standard.

9. The method as recited in claim 7, wherein the electrical current generated by the current generator has a magnitude selected so that the total current drawn by the PD is at least approximately ten milliamperes (10 mA) when the current generator is active.

10. The method as recited in claim 7, wherein the current generator is configured to sink the pulses of electrical current for at least approximately seventy five milliseconds (75 ms), with no more than at least approximately two hundred fifty milliseconds (250 ms) between successive pulses.

11. The method as recited in claim 7, wherein the electrical current generated by the current generator has a magnitude selected to account for a margin of error of current sensed by the current sensor.

12. The method as recited in claim 7, wherein the current generator is configured to be turned off when the total current drawn by the PD is greater than a threshold MPS requirement of the PSE.

13. A Maintain Power Signature (MPS) Powered Device (PD) comprising:
    an energy storage device configured to receive current flowing from Power Sourcing Equipment (PSE) to the PD; and
    a current generator configured to sink pulses of electrical current to the energy storage device for preventing the PSE from removing power to the PD, the electrical current comprising a timing characteristic selected based upon MPS requirements of the PSE.

14. The current sense based MPS device as recited in claim 13, wherein the electrical current further comprises a current amplitude characteristic, wherein the current amplitude characteristic of the electrical current is selected based upon the IEEE 802.3at-2009 standard.

15. The current sense based MPS device as recited in claim 13, wherein the electrical current generated by the current generator has a magnitude selected so that the total current drawn by the PD is at least approximately ten milliamperes (10 mA) when the current generator is active.

16. The current sense based MPS device as recited in claim 13, wherein the current generator is configured to sink the pulses of electrical current for at least approximately seventy five milliseconds (75 ms), with no more than at least approximately two hundred fifty milliseconds (250 ms) between successive pulses.

17. The current sense based MPS device as recited in claim 13, wherein the electrical current generated by the current generator has a magnitude selected to account for a margin of error of current sensed by the current sensor.

18. The current sense based MPS device as recited in claim 13, wherein the energy storage device comprises at least one of a capacitor or a battery.

* * * * *